United States Patent
Wiesler et al.

[11] Patent Number: 5,346,256
[45] Date of Patent: Sep. 13, 1994

[54] DEVICE FOR MOTORIZED MOVEMENT OF A SAFETY BELT IN A MOTOR VEHICLE

[75] Inventors: Martin Wiesler, Baden-Baden-Neuweier; Thomas Huck, Lichtenau; Herbert Schiller, Buehlertal, all of Fed. Rep. of Germany

[73] Assignee: Robert Bosch GmbH, Stuttgart, Fed. Rep. of Germany

[21] Appl. No.: 977,423

[22] PCT Filed: Aug. 6, 1991

[86] PCT No.: PCT/DE91/00630
§ 371 Date: Feb. 9, 1993
§ 102(e) Date: Feb. 9, 1993

[87] PCT Pub. No.: WO92/02388
PCT Pub. Date: Feb. 20, 1992

[30] Foreign Application Priority Data

Aug. 9, 1990 [DE] Fed. Rep. of Germany ....... 4025217
Aug. 23, 1990 [DE] Fed. Rep. of Germany ....... 4026637

[51] Int. Cl.5 .............................................. B60R 22/02
[52] U.S. Cl. .................... 280/802; 280/807; 280/808; 297/481
[58] Field of Search ............... 280/802, 807, 808, 805, 280/801 A, 801 R; 297/469, 470, 471, 474, 481, 483

[56] References Cited

U.S. PATENT DOCUMENTS 4,175,633 11/1979 Andres et al. .................. 280/807 X
4,993,748 2/1991 Jambor et al. ....................... 280/808

FOREIGN PATENT DOCUMENTS 0116839 8/1984 European Pat. Off. .
3633902 4/1988 Fed. Rep. of Germany .
3909361 6/1990 Fed. Rep. of Germany .
2384510 10/1978 France .
0270264 11/1988 Japan .......................... 280/808

Primary Examiner—Margaret A. Focarino
Assistant Examiner—Peter C. English
Attorney, Agent, or Firm—Michael J. Striker

[57] ABSTRACT

Device for motorized movement of a safety belt in a motor vehicle from a stored position to a deployed position, has a drive including a pinion drivable in opposite rotation directions; a toothed rack meshing with the pinion and having a component part structured to loosely hold the safety belt at an end portion thereof, the component part being seated in an interior region of the motor vehicle when the safety belt is in the stored position and having an elongated guide carriage and toothed rack provided with a slide guide extending in a longitudinal direction in the toothed rack, the slide guide and the elongated guide carriage being structured so that the guide carriage is slidable in the slide guide; and a mechanism for displacing the component part relative to the toothed rack in a direction the component part moves during motion of the safety belt into the deployed position against a spring force.

5 Claims, 2 Drawing Sheets

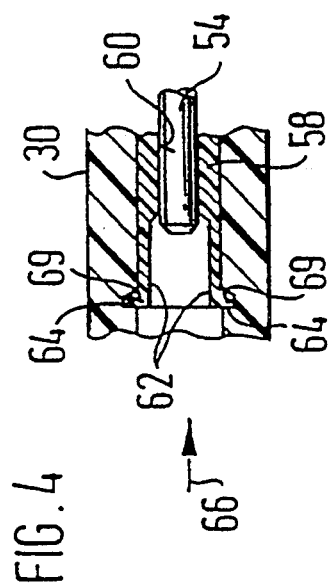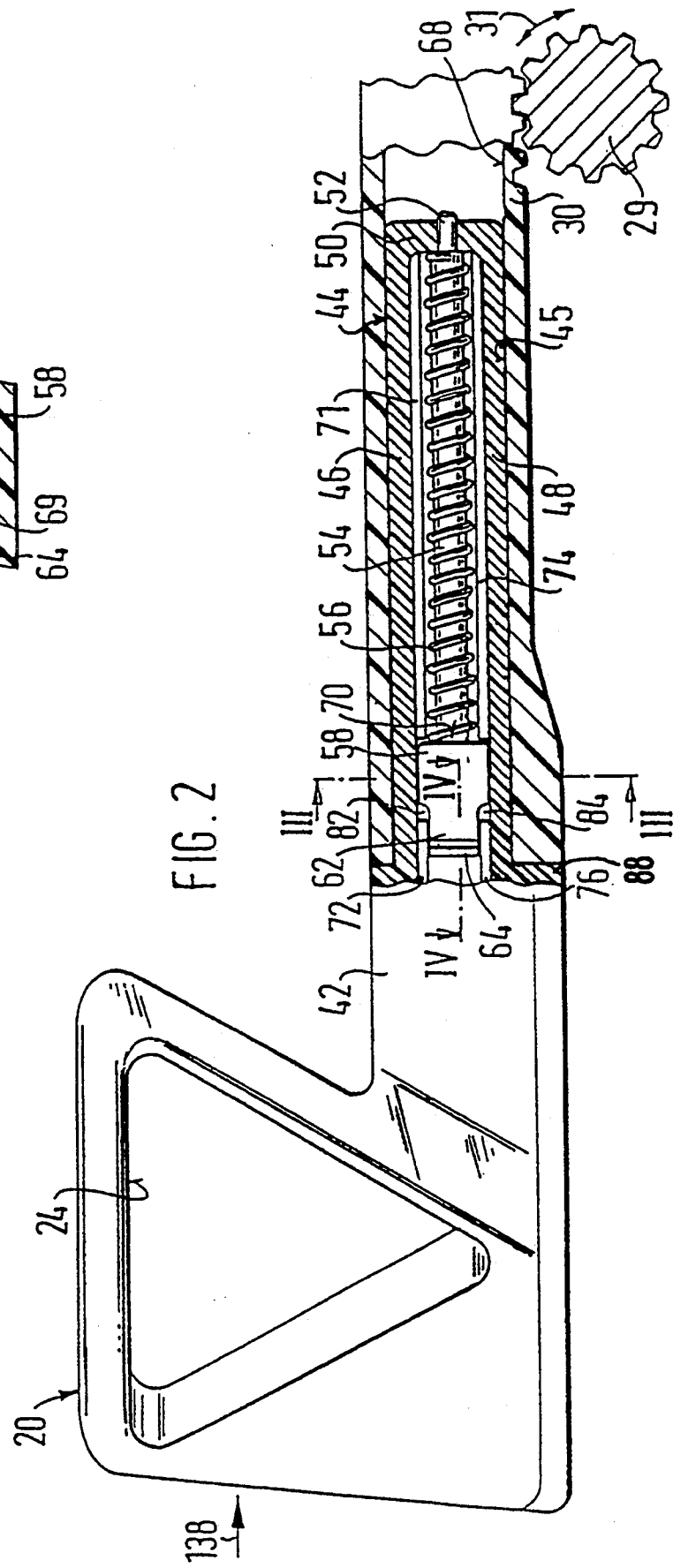

3,346,256

DEVICE FOR MOTORIZED MOVEMENT OF A SAFETY BELT IN A MOTOR VEHICLE

BACKGROUND OF THE INVENTION

The invention relates to motorized operation of a safety belt in a motor vehicle. In a known device, which is already commercially available, an end switch reports to an electronic control device when the safety belt is in the stored position and the electronic control device switches off the drive motor for the pinion. A switching or trip cam which triggers the control pulse in cooperation with the end switch is associated with this end switch. Since the structural component part must be positioned in a very specific manner with reference to a defined interior region of the motor vehicle serving as contact point for the structural component part in the stored position, a relatively costly adaptation must be effected between the end switch and the trip cam. This is all the more true as the position of the defined interior region of the motor vehicle is itself subject to determined tolerances.

SUMMARY OF THE INVENTION

It is an object of the present invention to provide a device for motorized movement of a safety belt in a motor vehicle from a stored position to a deployed position which does not have the above-described disadvantages.

According to the invention, the device for motorized movement of a safety belt in a motor vehicle from a stored position to a deployed position, comprises drive means including a pinion drivable in opposite rotation directions; a toothed rack having a component part structured to loosely hold the safety belt at an end portion thereof, the component part contacting an interior region of the motor vehicle when the safety belt is in the stored position; and means for displacing the component part relative to the toothed rack in a direction the component part moves during motion of the safety belt into the deployed position against a spring force.

The device, according to the invention, has the advantage over the prior art that the costly adaptation between the trip cam and end switch can be dispensed with while taking into account the position of the structural component part on the defined interior region of the motor vehicle because, after contacting the defined position, the structural component part can be moved relative to the toothed rack for as long as it takes to achieve the switching position of the trip cam. Of course, for this purpose the possible displacing movement must be greater than that required for the defined interior region with reference to the toothed rack due to the positional tolerances.

In a preferred embodiment the component part holding the safety belt has an elongated guide carriage and the toothed rack is provided with a slide guide extending in a longitudinal direction in the toothed rack. The slide guide and said elongated guide carriage are structured so that the guide carriage carrying the component part is slidable in the slide guide. The guide carriage advantageously has a frame structure and a plurality of frame parts. The means for displacing the component part advantageously includes a guide pin arranged in a region surrounded by the frame parts and secured in a longitudinal direction of the guide carriage, a structural member fixed relative to the toothed rack and a pretensioned helical spring surrounding the guide pin, one end of the spring being braced on one of the frame parts and another end on the structural member. The structural member advantageously has means for connection with the toothed rack, is positioned between the frame parts and is provided with a longitudinal bore hole in which the guide pin is guided slidably.

The component part holding the seat belt advantageously has a recess and holds the safety belt loosely in the recess.

BRIEF DESCRIPTION OF THE DRAWING

The objects, features and advantages of the present invention will now be illustrated in more detail by the following detailed description, reference being made to the accompanying drawing in which:

FIG. 2 is a detailed partially cross-sectional view of a portion of a toothed rack belonging to the device shown in FIG. 1 shown connected with a component part for loosely holding the safety belt;

FIG. 4 is a detailed sectional view through the device shown in FIG. 2 taken along the section line IV—IV of FIG. 2.

DETAILED DESCRIPTION OF THE PREFERRED EMBODIMENT

Figure 1:
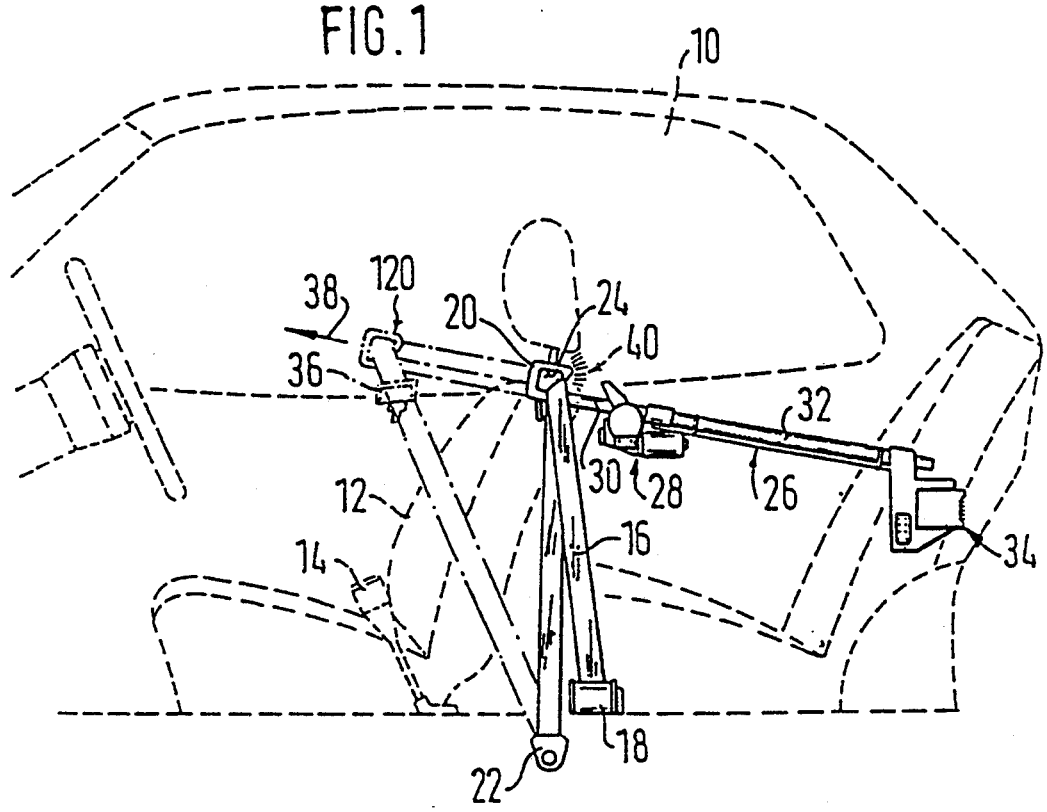
FIG. 1 is a schematic side view of a passenger compartment of a motor vehicle and safety belt having one embodiment of a device for motorized operation according to the invention.
Figure 3:
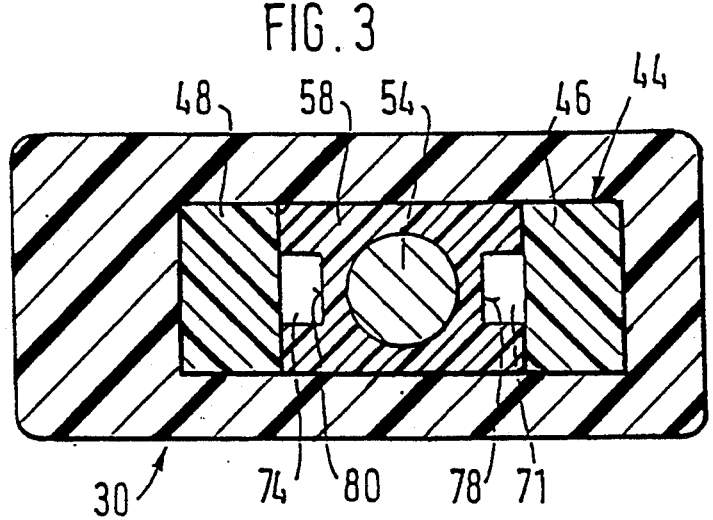
FIG. 3 is a detailed cross-sectional view through the device shown in FIG. 2 taken along section line III—III.

The passenger compartment area 10 of a motor vehicle is shown in dashed lines in FIG. 1. A locking seat belt 14 belonging to a safety belt system including safety belt 16 is shown next to the passenger seat 12. The safety belt 16 is guided from a wind-up device 18 fixed to the body of the motor vehicle to a fastener 22 pivotally attached to the vehicle body via a deflecting ring 20. This deflecting ring is constructed as an annular structural member and receives the safety belt 16 loosely in its recess 24. The deflecting ring 20 is part of a safety belt deploying system 26 which is securely connected with the body of the motor vehicle. In the motor vehicle according to the embodiment in FIG. 1, this system is arranged in the side paneling in the region of the rear bench seat. If the motor vehicle is a coupe which has doors only in the region of the front seats, the system can be mounted on body of the vehicle in the region of the rear seat. The safety belt deploying system 26 has a drive unit 28 which has an electric motor and a toothed pinion 29 acting as a power take-off member. The toothed pinion 29 meshes with a toothed rack 30 which is longitudinally displaceable in a guide sleeve 32. The safety belt deploying system 26 also includes an electronic control unit 34. As also shown in FIG. 1, the toothed rack 30, together with the deflecting ring 20, is guided into a deployed position 120 shown by a dash-dot line in FIG. 1 when the drive unit 28 is actuated. In this deployed position, the deflecting ring 20 is located in front of the person seated on the seat 12 so that this person can grasp and fasten the safety belt with the insertion clip 36 without contorting his body. During this deploying movement, which is effected in the direction of arrow 38, the safety belt 16 unwinds in the wind-up device 18 and the mounting 22 swivels out of the position shown in the drawing so as to ensure a proper guidance of the belt. After the belt 16 is fastened the deflecting brace 20 is returned to its stored retracted position, shown in solid lines in the drawing, and the belt winder 18 ensures a proper contact of the safety belt 16 on the person to be secured. The deflecting ring 20 is again located next to the shoulder of the passenger to be secured. For this return movement, which is effected in a direction opposite to that of arrow 38, the pinion 29 is driven in a different rotating direction (double arrow 31) than that of the deploying movement (arrow 38). Thus, the rotating direction of an electric drive motor belonging to the drive unit 28 can be reversed. It is further noteworthy that the belt deploying system 26 is accommodated and arranged in the side paneling of the motor vehicle in such a way that the deflecting ring 20 in the deployed position is located obliquely in front of the person seated on the seat 12. Thus, in its extended position the toothed rack 30 is oriented at an acute angle with the inner wall of the body. A special region 40 for the deflecting ring 20 is formed in the interior wall of the motor vehicle where the deflecting ring 20 makes contact when located in its stored position, shown in solid lines in FIG. 1. A trip cam cooperating with an end switch determines the end of the return movement of the toothed rack 30 and deflecting ring 20 from the deployed position 120 opposite arrow 38 into the stored position shown in FIG. 1. The trip cam and end switch must be adapted to one another in such a way that none of the allowable tolerances impair the proper contacting of the deflecting ring 20 at the defined interior region 40 of the motor vehicle, even if these tolerances lie on the same side. However, if the allowable tolerances lie on the other side this is compensated for in that the deflecting ring 20 can be displaced relative to the toothed rack 30 from a rest position in the direction of the deploying movement 38 against the force of a spring. The degree of possible displacement is thus greater than the maximum degree of tolerance given by the defined interior region 40 for the stored position of the toothed rack 30 brought about by the end switch. This so-called over-springing is achieved in the following way: The deflecting ring 20 is a structural component part which is connected with an elongated guide carriage 44 via a projection 42. This guide carriage 44 is guided in a slide guide 45 of the toothed rack 30 so as to be displaceable in the longitudinal direction. The guide carriage 44 has a frame structure. Accordingly, it has two elongated frame parts 46, 48 which are substantially parallel to one another and are connected with one another at a distance from the projection 42 via a crosspiece 50. This crosspiece 50 receives an end 52 of a pin 54 extending inside the frame from the crosspiece 50 to the projection 42. The pin 54 is surrounded by a helical pressure spring 56 which is supported by one of its ends at the inside of the frame part 50. The projecting end 52 of the pin 54 has a smaller diameter than the diameter of the pin 54 between the two frame parts 46 and 48 so that the pin 54 is supported by an annular collar at the inside of the frame part 50. The pin 54 is accordingly secured in the longitudinal direction of the guide carriage. The end of the guide pin 54 remote of the pin end 52 is guided in a structural member 58 which is fixed relative to the toothed rack 30. This arrangement can be seen particularly in FIGS. 2 and 4. As shown in FIG. 4 the structural member 58 has a longitudinal bore hole 60 which receives the pin 54. The structural member 58 which is produced from resiliently-elastic plastic is provided with two spring tabs 62 which are arranged opposite one another and project beyond the end of the pin 54, locking cams 64 being arranged at the outside of the spring tabs 62. To mount the structural component part 58 in the toothed rack 30 it can be inserted in the direction of the arrow 66 into a recess 69 forming the slide guide 45. Due to the particular construction of the spring tabs 62 relative to the pin 54, the spring tabs 62 can be deflected out until the locking cams 64 can be guided into the guide recess 69 of the toothed rack 30. When the locking cams 64 arrive in the region of their associated locking receptacles 69 the latter spring into the mounted position shown in FIG. 4, so that the structural component part 58 is arranged so as to be fixed with respect to the toothed rack. In so doing, the bore hole 60 assumes the function of a slide guide for the pin 54. An end face 70 of the structural component part 58 facing the frame part 50 serves to support the other end of the helical pressure spring 56 which is accordingly positioned so as to be pretensioned between the frame part 50 and the structural component part 58. The opposite inner sides of the frame parts 46 and 48 have two guide ribs 71, 72 and 74, 76, respectively, which are flush with one another and are associated with guide grooves 78, 80 of the structural component part 58 (FIG. 3). A length 82, 84 without ribbing is provided between the aligned guide ribs 70, 72 and 74, 76, respectively, to allow easy assembly of the structural component part 58.

When the deflecting ring 20 comes in contact e.g. with a region at the defined interior region 40 of the motor vehicle during the return movement of the deflecting ring 20 in the direction of the arrow 138—that is, opposite the direction of arrow 38 of the deploying movement (FIG. 1) —but the end switch does not yet send any switch-off pulse to the electronic control unit 34, a relative movement is effected between the toothed rack 30 and the deflecting ring 20 with its projection 42. In so doing, the toothed rack 30 executes a movement in the direction of arrow 138 (FIG. 2), while the deflecting ring 20 with its projection 42 is secured at the defined interior region 40 of the motor vehicle. In so doing, the structural component part 58 which is securely connected with the toothed rack 30 compresses the helical pressure spring 56 to an increasing extent and the guide carriage 44 moves increasingly farther out of the slide guide 45 until the end switch, in cooperation with the trip cam, stops the drive unit 28 operated by the electric motor. A certain springing-out resistance is advisably provided to prevent injury to persons sitting in the rear seats of the motor vehicle, for example, if these persons grasp the respective interior region 40 of the motor vehicle while the deflecting ring 20 runs into its stored position. If the deflecting ring 20 with the belt 16 is to be returned to the deploying position again after this, but the toothed rack 30 is displaced in the direction of the arrow 38, the deflecting ring 20 at first remains at the interior region 40 until the pressure spring 56 holds the end face 88 of the projection 42 facing the toothed rack 30 in contact with the toothed rack 30. This position, shown in FIG. 2, is designated as the rest position.

It is clear that the described embodiment is one of many possible versions. For example, it is conceivable to arrange the deflecting ring 20 directly at the toothed rack so as to be displaceable without the need of a projection 42.

While the invention has been illustrated and embodied in a device for motorized operation of a safety belt in a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily apt it for various applications without omitting features that, from the standpoint of prior art, fairly constitute essential characteristics of the generic or specific aspects of this invention.

What is claimed is new and desired to be protected by Letters Patent is set forth in the appended claims.

1. A device for motorized movement of a safety belt in a motor vehicle from a stored position to a deployed position, said device comprising drive means including a pinion drivable in opposite rotation directions;

a toothed rack meshed with said pinion and having a component part structured to loosely hold said safety belt at an end portion thereof, said component part contacting an interior region of said motor vehicle when said safety belt is in said stored position; and means for displacing said component part relative to said toothed rack against a spring force and in a direction said component part moves during motion of said safety belt into said deployed position, said component part having an elongated guide carriage and said toothed rack is provided with a slide guide extending in a longitudinal direction in said toothed rack, said slide guide and said elongated guide carriage being structured so that said guide carriage is guided slidably in said slide guide, said guide carriage having a frame structure comprising two parallel frame parts connected by a cross piece frame part, and a guide pin arranged in a region surrounded by said frame parts and secured to said guide carriage in a longitudinal direction of said guide carriage.

2. Device as defined in claim 1, further comprising a structural member fixed relative to said toothed rack and a pretensioned helical spring surrounding said guide pin, one end of said spring being braced on said cross piece frame part and another end on said structural member, said helical spring providing said spring force.

3. Device as defined in claim 2, wherein said structural member has means for connection with said toothed rack, is positioned between said parallel frame parts and is provided with a longitudinal bore hole, said guide pin being guided slidably in said bore hole.

4. Device as defined in claim 3, wherein said structural member has two sides parallel to an axis of said guide pin and at least one of said two sides has a guide groove and said guide carriage is provided with a guide rib slidable in said guide groove.

5. Device as defined in claim 1, wherein said component part has a recess that is approximately annular and holds said safety belt loosely in said recess.

* * * * *